United States Patent [19]
Dorner et al.

[11] Patent Number: 5,174,435
[45] Date of Patent: Dec. 29, 1992

[54] CONVEYOR CONSTRUCTION

[75] Inventors: Wolfgang C. Dorner, Oconomowoc; Kenneth A. Hansen, Waukesha; Michael A. Hosch, Oconomowoc, all of Wis.

[73] Assignee: Dorner Mfg. Corp., Hartland, Wis.

[21] Appl. No.: 637,536

[22] Filed: Jan. 4, 1991

[51] Int. Cl.$^5$ .............................. B65G 39/16
[52] U.S. Cl. ........................ 198/806; 198/816; 198/813; 198/840; 198/842
[58] Field of Search .............. 198/806, 813, 816, 840, 198/842

[56] References Cited

U.S. PATENT DOCUMENTS

| | | | |
|---|---|---|---|
| 1,347,121 | 7/1920 | Rice | 198/813 |
| 1,913,040 | 6/1933 | Pierson | 198/813 X |
| 2,190,336 | 2/1940 | Olson | 198/842 X |
| 2,808,924 | 10/1957 | Wood | 198/816 |
| 2,914,957 | 12/1959 | Johnson | 198/807 X |
| 3,035,685 | 5/1962 | Raynor | 198/816 X |
| 3,118,315 | 1/1964 | Loosli | 198/816 |
| 3,217,554 | 11/1965 | Stalker | 198/842 X |
| 3,519,121 | 7/1970 | Baldwin et al. | 198/842 X |
| 3,718,197 | 2/1973 | Barten et al. | 198/816 X |
| 3,752,298 | 8/1973 | Wenger | 198/816 |
| 3,878,937 | 4/1975 | Glaser et al. | 198/816 |
| 3,921,793 | 11/1975 | Hutchinson et al. | 198/816 X |
| 3,923,148 | 12/1975 | Dorner . | |
| 4,225,036 | 9/1980 | Michael | 198/840 |
| 4,438,617 | 3/1984 | Ulrich et al. | 198/840 X |
| 4,993,542 | 2/1991 | Nomura | 198/816 |

FOREIGN PATENT DOCUMENTS

567473 11/1958 Belgium ........................ 198/806

Primary Examiner—D. Glenn Dayoan
Attorney, Agent, or Firm—Andrus, Sceales, Starke & Sawall

[57] ABSTRACT

A conveyor construction including a frame having a pair of side rails with each side rail having a longitudinal T-shaped slot. A plurality of cross members are connected between the side rails and support a bed plate. An endless belt rides on the bed plate and is trained over an adjustable spindle assembly which is located at an end of the conveyor. The spindle assembly includes a spindle journalled between a pair of side members that are mounted for sliding movement in the T-slots of the respective side rails. A ratchet and pinion mechanism interconnects the conveyor frame with the spindle assembly and acts to move the spindle assembly longitudinally of the frame to tension the belt. A belt tracking mechanism is associated with each side of the spindle assembly and includes a cam member which is engaged with the respective side member of the spindle assembly. Individual rotation of the cam members serve to properly track the belt on the bed plate. To attach components to the conveyor frame, spring loaded nuts are slidably mounted in the T-slots of the side rails and the components are attached to the spring loaded nuts.

21 Claims, 6 Drawing Sheets

CONVEYOR CONSTRUCTION

BACKGROUND OF THE INVENTION

U.S. Pat. No. 3,923,148 describes a conveyor construction for conveying relatively small parts or articles in which the conveyor belt is trained over a pair of spindles or rollers and each spindle is journaled relative to the conveyor frame by bearing assemblies which are located within the ends of the spindle. As the bearing assemblies are located inboard of the side rails of the conveyor, two conveyors can be placed in close side-by-side relation.

There are a number of features which are important in the design of a conveyor. One of the features in the ease and quickness of removal of the belt for maintenance or replacement. In certain types of conveyors utilizing a U-shaped frame, it is necessary to remove the bed plate from the frame in order to replace the belt and this is a time consuming task.

Another desired feature for a conveyor is a precise mechanism for tensioning and tracking the conveyor belt. In many conveyors, the belt tensioning and tracking mechanisms are combined by journaling the ends of the tensioning roll or spindle in slide blocks which are slidable relative to the conveyor frame. By individually adjusting the position of the slide blocks, the belt tension and tracking can be adjusted. However, in mechanisms of this type a tracking adjustment can effect the tensioning, and vice versa, so that trained personnel is required in order to properly adjust the tension and tracking.

A further desirable feature for a conveyor is the ability to attach components, such as sensors, guides, stops, and the like, to the conveyor frame and to be able to position the components at various locations along the length of the conveyor. In certain types of conveyors, as used in the past, components could only be attached at specific locations along the length of the conveyor by utilizing the screws or fasteners which connect the bed plate to the side rails, or by drilling specially located holes.

SUMMARY OF THE INVENTION

The invention is directed to an improved conveyor construction. The conveyor includes a frame having a pair of spaced parallel side rails, each being formed with a longitudinal T-shaped slot. The side rails are connected together by a plurality of spaced transverse cross members and each cross member is provided with an upwardly facing T-shaped slot. A bed plate, which supports the upper run of the conveyor belt, is mounted on the upper surfaces of the cross members. To secure the bed plate to the cross members, a plurality of nuts can be slidably mounted in each slot in the cross member and screws extend through openings in the bed plate and are threaded with the nuts to secure the bed plate to the cross members.

The conveyor belt is trained over an adjustable spindle assembly which is located at one or both ends of the conveyor frame. The spindle assembly includes a spindle or roller that is journaled between a pair of side members that are mounted for sliding movement in the respective T-slots of the side rails. Tension on the belt is adjusted by a rack and pinion mechanism. At least one rack is mounted on the conveyor frame between the side rails and extends longitudinally of the frame. An end of the rack is engaged with the spindle assembly. A pinion is mounted transversely between the side rails and is engaged with the rack. Rotation of the pinion will move the rack longitudinally and thereby adjust the position of the spindle assembly and control the tension on the conveyor belt.

The invention also includes a belt tracking mechanism which is separate from the belt tensioning mechanism. The belt tracking mechanism includes a pair of cam blocks each of which is mounted in one of the T-slots in the side rails. Each cam block includes a rotatable cam or eccentric that is engaged with the corresponding side member of the spindle assembly. By individually rotating each cam, each side member of the spindle assembly can be moved longitudinally to thereby skew or track the conveyor belt.

As a feature of the invention, various components can be attached to the conveyor frame through spring loaded nuts or T-nuts which are mounted for sliding movement in the T-slots in the side rails. Each nut is formed with a generally rectangular inner section and a square outer section. To install the nuts, the narrow dimension of the rectangular inner section is inserted into the T-shaped slot and the nut is then rotated 90° to lock the wider portion of the rectangular inner section in the slot. A spring that is positioned between the inner section of the nut and the inner wall of the slot urges the outer square section of the nut into the stem portion of the T-slot. Various components, such as guides, photosensors, stops, and the like can be attached through screws to the spring loaded nuts. As the nuts are slidable within the T-slot, the location of the components can be positioned as desired.

Each of the side rails of the conveyor frame is also provided with an upper groove and a lower laterally extending rib which are spaced vertically from the T-slot in the side rail. A side wiper can be snap-fitted into the upper groove and includes an inclined surface which extends inwardly and downwardly over the side edge of the conveyor. In addition, clamping blocks can be connected to the lower rib in each side rail and serve to connect the conveyor frame to a supporting structure or base, or alternately, serve to connect auxiliary components, such as a drive system, to the conveyor frame.

In a modified form of the invention, the construction includes a pair of spaced parallel conveyors with each conveyor including an outer side rail, and a series of cross members extend transversely between the side rails. Each conveyor includes an endless conveyor belt and a common drive spindle extends transversely between corresponding ends of the conveyors and serves to drive the belts. At the opposite ends of the conveyors, the side rails project longitudinally beyond the last cross member of the series and each conveyor includes an inner side rail section which is disposed in parallel spaced relation to the projecting end of the outer side rail.

A spindle assembly, which includes a rotatable spindle, is mounted for sliding movement relative to the projecting end of each conveyor and a belt tensioning mechanism and a belt tracking mechanism, similar to that employed in the first embodiment, are associated with the projecting end of each conveyor to tension the respective conveyor belt and provide proper tracking of the belt.

The invention provides a conveyor in which the belt can be more readily and quickly removed for maintenance or replacement. In addition, the conveyor can be readily changed in width by substituting cross members of different lengths and exchanging drive belt spindles.

In the invention, the belt tensioning and tracking mechanism are individually operated which enables the belt to be more readily tensioned and tracked by inexperienced personnel. After the belt has been properly tensioned, the tracking mechanism is operated to provide the desired tracking of the belt. The cam operated belt tracking mechanism provides an infinite adjustment for tracking with minimum interference with the tensioning.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
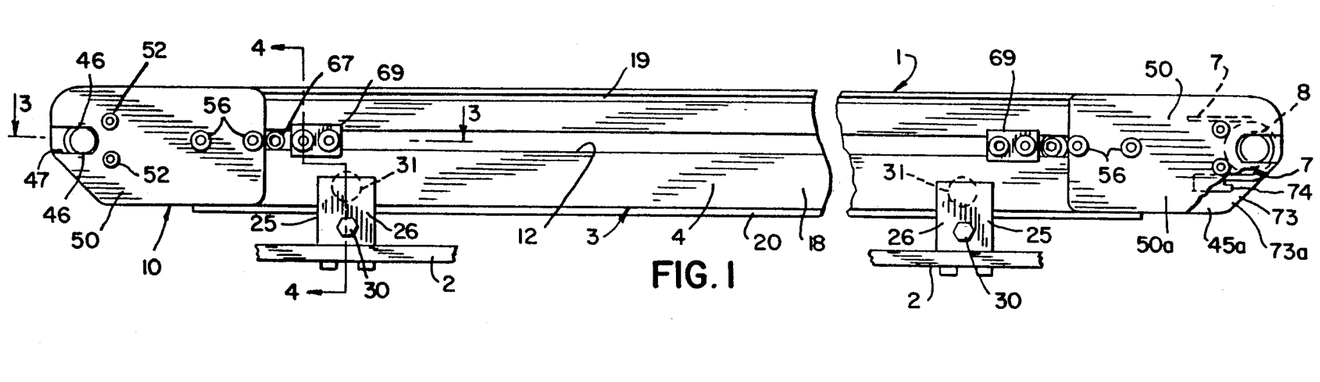
FIG. 1 is a side elevation of the conveyor of the invention.
Figure 2:
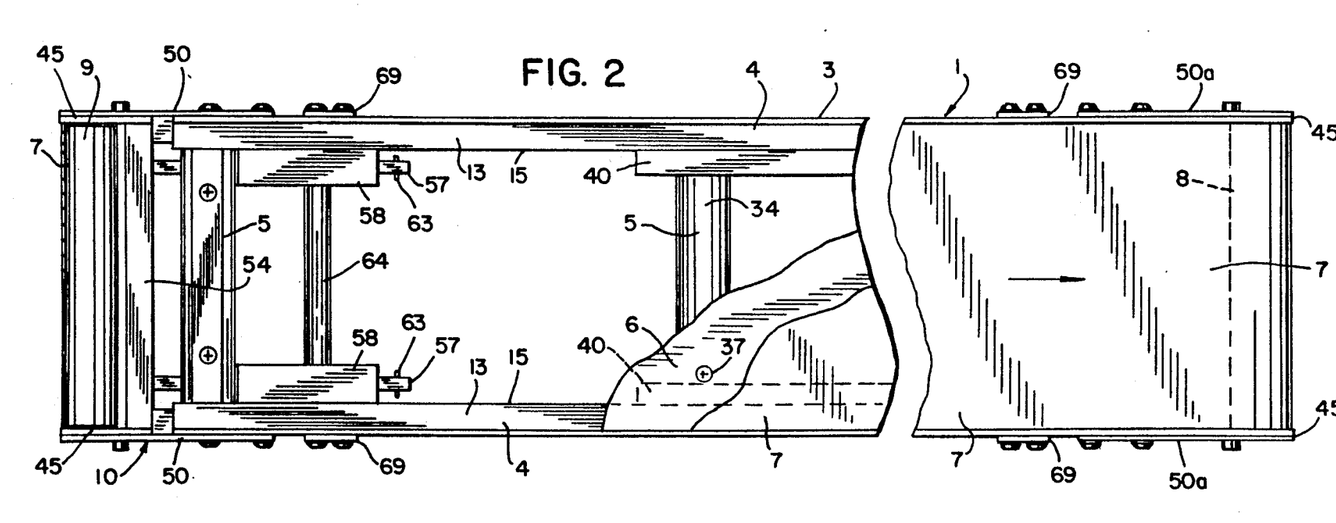
FIG. 2 is a top view of the conveyor with parts broken away.

FIGS. 1 and 2 illustrate a conveyor 1 mounted on a base or supporting structure 2 and which has particular use for conveying relative small parts or articles. Conveyor 1 includes a frame 3 composed of a pair of spaced, parallel side rails 4 which are connected by a plurality of cross members 5. A bed plate 6 is mounted on the cross members 5 and supports the upper run of an endless conveyor belt 7. Belt 7 is trained over a drive spindle 8 located at one end of the conveyor and an idler spindle 9 mounted on an adjustable spindle assembly located at the opposite end of the conveyor. A conventional power source which may take the form of a hydraulic or electric motor, not shown, is connected to drive spindle 8 to drive belt 7.

Figures 4, 5, 18:
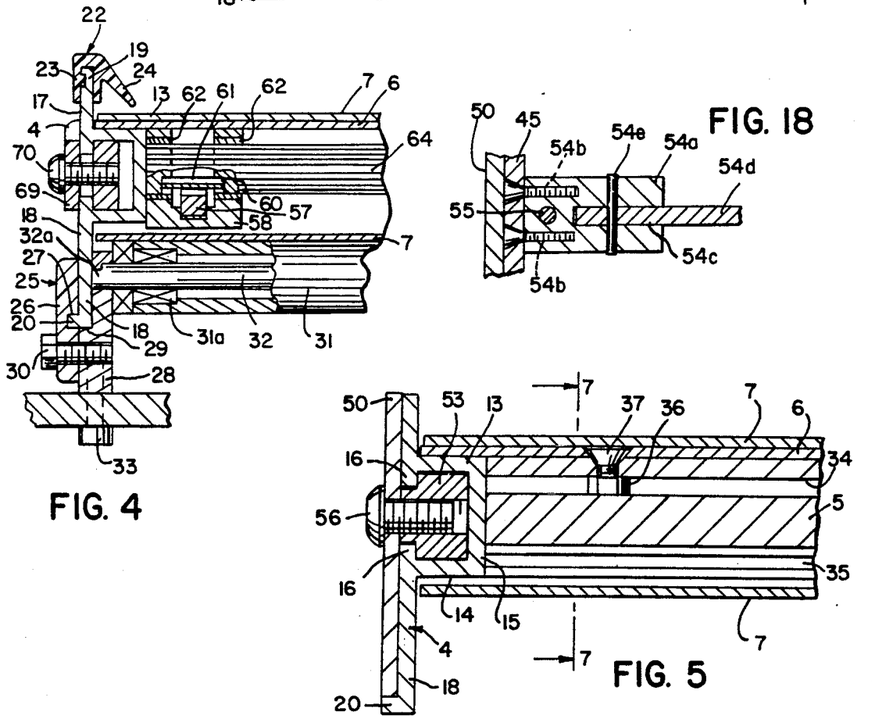
FIG. 4 is a section taken along line 4—4 of FIG. 1.
FIG. 5 is a section taken along line 5—5 of FIG. 3.
FIG. 18 is a section taken along line 18—18 of FIG. 3.
Figure 8:
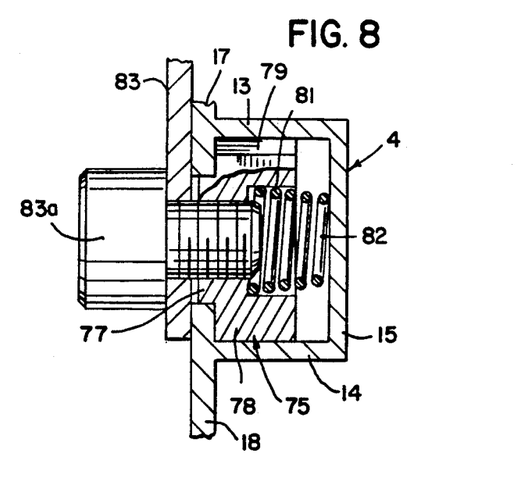
FIG. 8 is an enlarged vertical section of a side rail of the conveyor frame and showing the attachment of a spring nut.

Side rails 4, which can be formed of extruded aluminum, are each provided with a longitudinal slot 12 which extends the length of the side rail and which is generally T-shaped in cross section. Each slot 12, as seen in FIGS. 4, 5, and 8, is bordered by an upper wall 13, a parallel lower wall 14, and an inner wall 15 which connects walls 13 and 14. In addition, the outer portion of slot 12 is bordered by a pair of spaced lips 16 which define the stem portion of the T-shaped slot.

In addition, each side rail 4 is formed with an upwardly extending flange 17 which extends upwardly beyond the bed plate 6 and a downwardly extending flange 18. Flanges 17 and 18 are provided with a longitudinal groove 19 and a longitudinal rib or flange 20, respectively, which are located on either side of the T-slot 12 and extend the full length of the side rail.

As shown in FIG. 4, a side wiper 22, preferably formed of plastic, is connected to the upper flange 17 of each side rail. Wiper 22 includes a longitudinal rib 23 which is engaged with groove 19 and the inner portion of the wiper is formed with an inclined surface 24 which extends downwardly over the side edge of the conveyor belt 7.

The lower rib 20 in each side rail can be utilized to connect the side rails to the supporting structure or base 2 through clamps 25. As illustrated in FIG. 4, each clamp 25 includes an outer plate 26 having a longitudinal groove 27 having a longitudinal groove that is engaged with rib 20. In addition, each clamp 25 has an inner plate 28 which is positioned against the inner surface of lower flange 18 of the side rail and the lower edge of flange 18 engages a shoulder 29 in the clamping plate 28. A bolt 30 connects the plates 26 and 28 to secure the clamp to the side rail 4.

Where the conveyor has a substantial length, the lower run of belt 7 can be supported on one or more intermediate idler rollers 31, which are attached to clamping plates 28. As shown in FIG. 4, each roller is journalled by suitable bearings 31a on a shaft 32 and the ends of the shaft are secured within aligned openings in the respective clamping plates 28. Shaft 32 is secured against rotation by forming the ends of shaft 32 with a non-circular configuration, such as a D-shape, as shown in FIG. 4 by 32a, and the ends 32a are received in complementary openings in plate 28 of clamp 25. As rollers 31 are mounted to clamps 25, the rollers are removed from the conveyor frame with the clamps and this facilitates belt removal and replacement.

The lower surface of each clamping plate 28 is provided with a threaded opening and a screw 33 extends through a suitable opening in base 2 and is threaded within the opening to secure the side rail to the base 2. With this construction the clamps 25 are slidable on the ribs 20, so that the clamps can be positioned anywhere along the length of the conveyor frame.

Clamps 25 can also be used to attach auxiliary components to the conveyor frame. For example, a drive unit for driving belt 7 can be suspended from conveyor frame 3 by clamps 25 and this attachment enables the drive unit to be moved to any desired location along the length of the conveyor frame.

Figure 7:
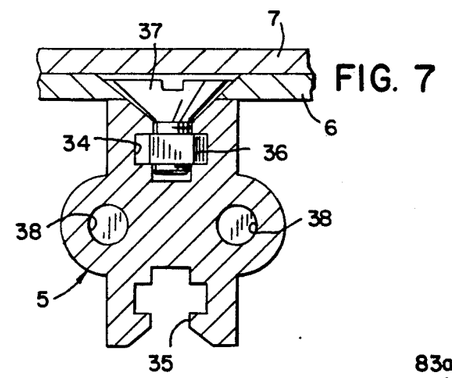
FIG. 7 is a view taken along line 7—7 of FIG. 5 showing the attachment of the bed plate to the cross members.

Each cross member 5 is formed with a longitudinal, upwardly facing T-shaped slot 34, as well as a longitudinal downwardly facing T-shaped slot 35, as shown in FIG. 7. A group of nuts 36 are slidably mounted in the upper slot 34 and screws 37 extend through suitable openings in bed plate 6 and are threaded in nuts 36 to secure the bed plate to the cross members.

To connect the cross members to the side rails 4, the ends of each cross member are formed with a pair of tapped holes 38. Connecting screws 39 extend through holes in inner wall 15 of the side rail and are threaded in the holes 38. As shown in FIG. 2, stiffening bars 40, which are preferably formed of steel and are generally rectangular in cross section, can be positioned against the inner surface of wall 15 of side rails 4 and extend a substantial portion of the length of the conveyor frame. In the area of stiffening bars 40, the connecting screws 39 also extend through holes in the bars.

Spindle assembly 10 includes a pair of cylindrical sleeves 41 which are located in the ends of the spindle 9 and the spindle is journaled on the sleeves through a radial bearing 42 and a thrust bearing 43, both of which are located within the confines of the spindle. See FIG. 3. The outer end of sleeve 41 is formed with an annular collar 44 which is located within an opening in plate 45. The outer end of collar 44 is formed with a pair of opposed flats 46 which are located approximately 180° apart and are received in outer plate 50. The engagement of the flats 46 with slot 47 prevents rotation of the sleeve 41 relative to the plate 50. Each plate 50 is connected to the corresponding plate 45 through bolts 52.

Figure 3:
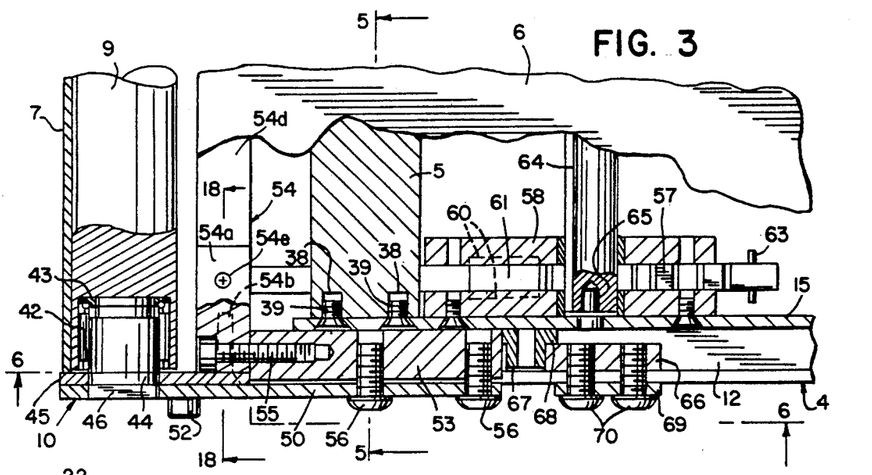
FIG. 3 is an enlarged horizontal section taken along line 3—3 of FIG. 1 showing the belt tensioning and tracking mechanism.

Spindle assembly 10 also includes a pair of slide bars 53 which are mounted for movement in the slots 12 of the respective side rails 4, as seen in FIG. 3. The outer ends of slide bars 53 are connected together by a cross bar unit 54 and screws 55 connect the ends of the cross bar unit to the respective slide bars 53.

To lock the slide bars 53 within the T-slots 12 of the side rails, a pair of screws 56 extend through openings in plate 50 and are threaded in holes in the corresponding slide bars. By turning down the screws 56, the slide bars will be drawn outwardly into engagement with the lips 16 bordering the slots 12 to thereby secure the slide bars in the slots 12.

Spindle assembly 10 is adapted to be moved longitudinally of the conveyor frame 3 to adjust the tension on the belt 7 by a rack and pinion mechanism. As illustrated, the rack and pinion mechanism includes a pair of racks 57, located between side rails 4, and each rack is mounted for sliding movement in a guide block 58 which is U-shaped in cross section and is connected to the inner surface of wall 15 bordering the T-slot 12 in the corresponding side rail 4. As shown in FIG. 4, the legs of slide block 58 are formed with aligned grooves 60 and a leaf spring 61 is received in the aligned grooves. Spring 61 is engaged with the upper surface of rack 57 and the force of the spring keeps one lock from locking with the pinion. Each guide block 58 is formed with a transverse opening and a wear ring 62 is located in each transverse opening, as shown in FIG. 4.

As shown in FIG. 3, the outer end of each rack 57 is engaged with cross member unit 54 of spindle assembly 10, and by moving the racks outwardly the spindle assembly will be correspondingly moved outwardly to apply tension to the conveyor belt 7. The inner end of each rack 57 is provided with a stop pin 63 which prevents complete displacement of the rack from the guide block 58.

Each rack 57 is moved longitudinally of the conveyor frame by an elongated pinion 64, which extends transversely of the conveyor frame. The ends of pinion 64 projects through the aligned openings in guide blocks 58 and are mounted for rotation in the wear rings 62. The teeth on the pinion 64 are engaged with the teeth of the racks 57 and by rotating the pinion, the racks will be moved, in unison, longitudinally of the conveyor frame 3 to thereby move spindle assembly 10 and apply tension to the belt.

To rotate the pinion 64, one or both ends of the pinion are provided with a hex-shaped hole 65 which is exposed through an opening in inner wall 15 of the side rail. Through use of a hex tool, pinion 64 can be rotated to thereby adjust the tension on the belt 7. After the proper tension is achieved, the spindle assembly 10 can be locked in position relative to the conveyor frame 3 by turning down the screws 56.

The invention also includes a belt tracking mechanism which enables the belt 7 to be skewed to provide proper tracking on the conveyor frame 3. The belt tracking mechanism includes a cam block 66 which is mounted for sliding movement in the slot 12 of each side rail. A cam or eccentric 67 is mounted for rotation on one end of each cam block 66 and is provided with a cam surface 68 which is disposed to engage the end of the respective slide bar 53, as illustrated in FIG. 3. Cam block 66 is secured to the respective side rail through use of a cover plate 69 which bears against the outer surface of the side rail and a pair of screws 70 extend through openings in the cover plate and are threaded in openings in the cam block. By tightening down screws 70, cam block 66 will be drawn outwardly into tight engagement with the lips 16 bordering the slot 12 to secure the cam block to the side rail.

With each cam block 66 locked in the position, as shown in FIG. 3, and the locking screws 56 loosened, the cam 67 can be rotated by inserting a tool into the hex-shaped hole 72 in the cam. Rotation of each cam will thus move the respective side bar 53 which will tend to skew or tilt the spindle assembly 10 and thus provide the desired tracking for the belt 7. As a cam 67 is associated with each side bar 53 of the spindle assembly, individual rotation of the cams will provide the desired tracking of the belt.

To provide the skewing action for spindle assembly 10, cross bar unit 54 is composed of a pair of end members 54a, each of which is connected by screws 54b to the respective side plates 45. The inner edge of each end member 54a is formed with an open ended slot 54c and the ends of a central bar 54d are mounted for horizontal pivotal movement in the respective slots by vertical the pins 54e, the spindle assembly 1 can be skewed on rotation of one of the cams 67 to thereby provide proper belt tracking.

To tension and track the belt 7, screws 56 are loosened to permit the spindle assembly 10 to slide relative to the side rails 4. Pinion 64 is then rotated by engaging a tool in the hex hole 65 causing the racks 57 to move outwardly in unison and correspondingly move the spindle assembly outwardly until the desired belt tension is achieved. The screws 56 are then tightened down to lock the spindle assembly in this position while maintaining pressure on the hex wrench which is engaged with the pinion 64.

The conveyor belt 7 is then subjected to a test run and checked for proper alignment. If the belt tracks toward one side or other, the tracking mechanism is then utilized. Screws 70 are loosened, enabling the cam blocks 66 to be slid outwardly in slots 12 until the cam blocks engage the inner ends of the slide bars 53 of the spindle assembly. The screws 70 are then turned down to lock the cam blocks 66 to the side rails 4. Screws 56 are then loosened and one or both of the cams 67 are then rotated through use of a hex wrench to provide the proper tracking for the belt. When proper tracking is achieved, the screws 56 are tightened down to lock the spindle assembly in that orientation. As the belt tracking operation is separate from the belt tensioning, the tracking can be performed by unskilled workmen. The use of the cams 67 provides an infinite adjustment for each side of the spindle assembly 10 to provide the proper tracking of the belt.

Figure 6:
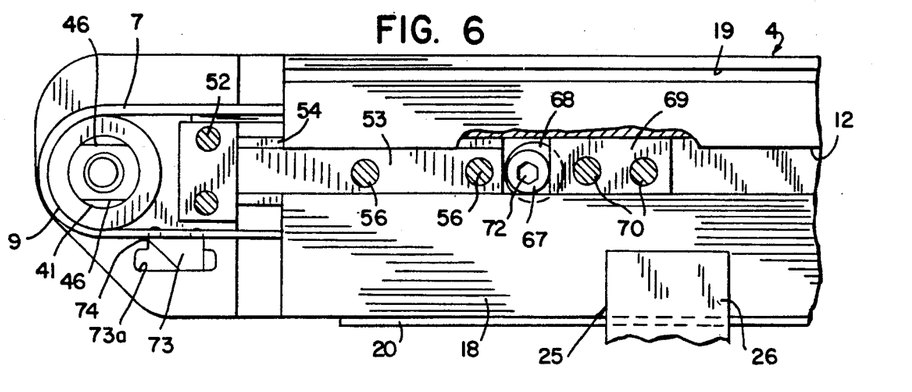
FIG. 6 is a view taken along line 6—6 of FIG. 3.

Small parts or articles, particularly if they are coated with oil, may tend to stick to the conveyor and not be discharged from the downstream end of the conveyor. To ensure that the parts are removed from the conveyor, a wiper 73 is located at the downstream end of the conveyor, or at both ends if the conveyor is reversible, and is connected between the plates 50. As shown in FIGS. 1 and 6, each plate 45 is provided with an opening 73a and the ends of the wiper are disposed within the aligned openings. Attachment of the outer plates 50 over the plates 45 will thus retain the wiper 73 in position. The openings 73a have a contour to receive either of two wiper configurations. For example, in one configuration, as shown in FIGS. 1 and 6, the wiper 73 is provided with a tapered or sharpened edge 74 which rides against the lower run of belt 7 to remove any articles that may adhere to the belt, after the belt passes around the spindle 8 at the end of the conveyor. Wiper 73 also acts to urge the belt upwardly towards the spindle 8.

Figure 14:
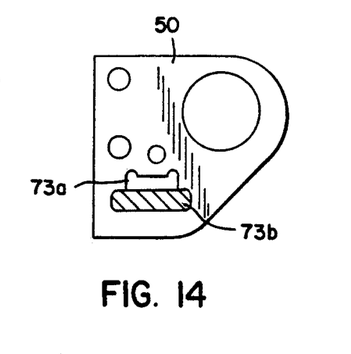
FIG. 14 is an enlarged fragmentary vertical section of an end of the conveyor and incorporating a modified form of belt wiper.

In a second configuration, as illustrated in FIG. 14, the wiper 73b has an elongated generally rectangular cross section and is received in the lower ends of openings 73a. A wiper similar to 73b is used where the belt 7 may have a sticky conveying surface or in situations where the joint between the ends is enlarged. The openings 73a will thus accommodate either wiper configuration.

As a feature of the invention, spring nuts 75 can be utilized to attach relatively light weight auxiliary components or equipment to the conveyor frame 3. The auxiliary components may comprise guides, arches, movable stops, photo eyes or sensors, and the like. Each nut 75 is mounted for sliding movement in the T-slot 12 of side rail 4 and the nut is provided with a central threaded opening 76 which can receive a screw, or other fastener, to attach the component to the nut.

Figure 9:
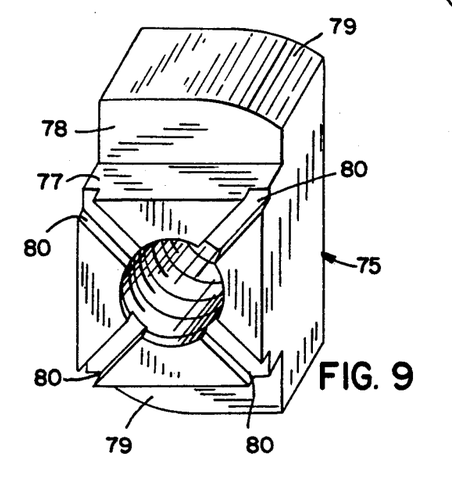
FIG. 9 is a perspective view of a spring nut.
Figure 10:
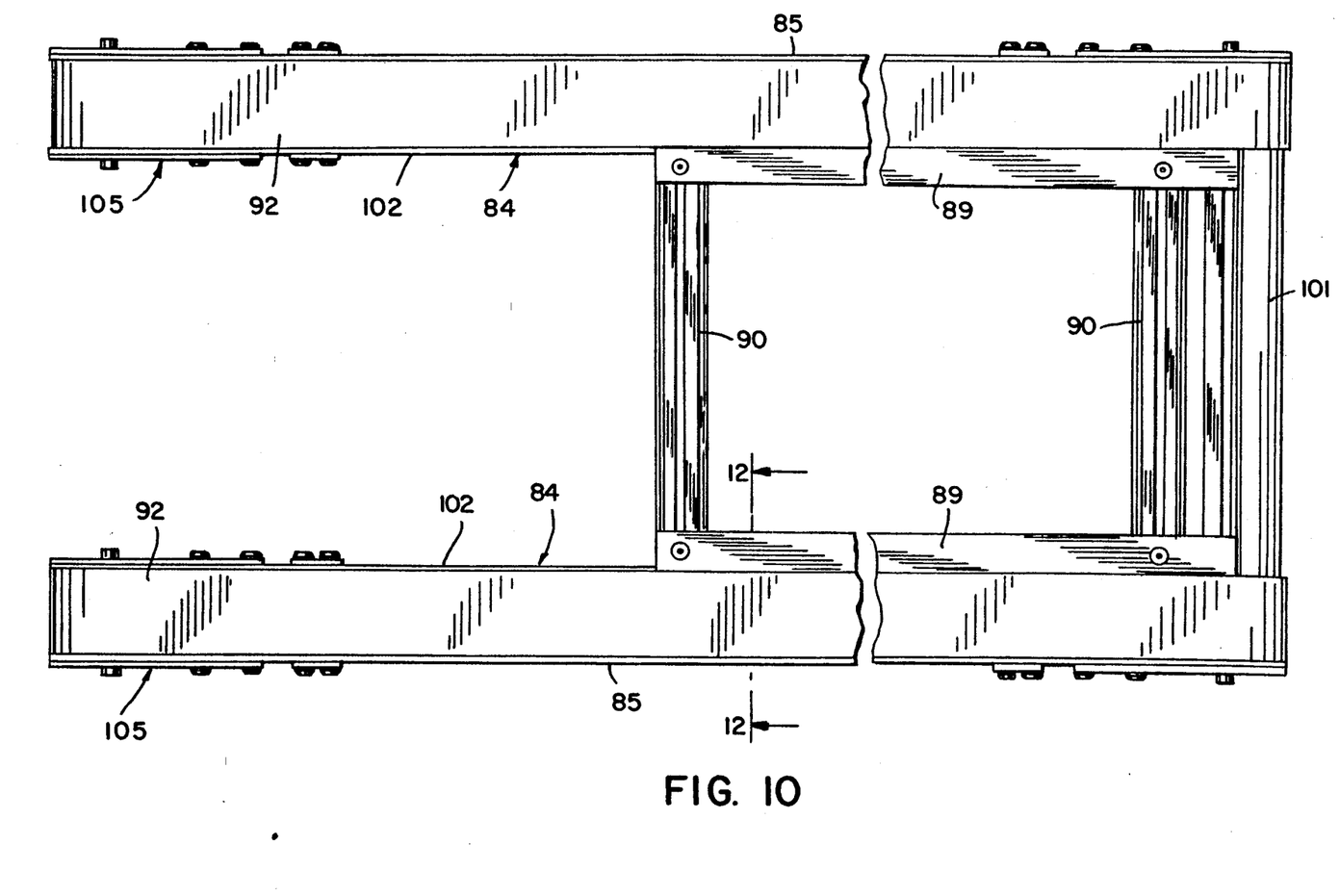
FIG. 10 is a top plan view of a second form of the invention utilizing two conveyor belts.

As best seen in FIG. 9, each nut 75 is provided with a generally square outer section 77 and a rectangular inner section 78. Opposed corners of the rectangular section 78 are rounded as indicated by 79. The outer surface of square outer section 77 is provided with a group of diagonal grooves 80 which are adapted to receive a screwdriver or other tool to rotate the nut.

The inner surface of the rectangular section 78 is formed with a recess 81 which borders the opening 76, and the large diameter end of a tapered coil spring 82 is received within the recess while the opposite end of the spring bears against the inner wall 15 bordering slot 12 The force of the spring 82 will urge the nut outwardly, with the square outer section 77 being located between lips 16 of the side rail. The tapered configuration prevents the coils of the spring from hanging up in the recess 81 when the spring is compressed.

To install the nut 75, the narrow dimension of rectangular section 78 is aligned with the outer portion of slot 12 between lip 16 and the nut is then inserted into the slot 12. Using a tool engaged with the grooves 80, the nut is then rotated which will bring the wider dimension of the rectangular section 78 into engagement with the walls 13 and 14 bordering slot 12, thus locking the nut against longitudinal movement within the slot. The force of the spring 82 will urge the nut outwardly to position the outer square section 77 between the lips 16, thereby locking the nut against rotation. One or more brackets 83 which carry auxiliary components can then be connected to the nut through use of a screw 83a which engages the opening 76 in the nut 75.

The construction of the spring nuts 75 enables the nuts to be inserted into the T-slot 12 anywhere along the length of the slot and then locked in position. Thus, it is not necessary to insert the nuts into the open ends of the slot, for the open ends of the slot normally contain other components, such as the slide bars 53, which would prevent insertion of the nuts into the open ends of the slots 12.

The conveyor of the invention provides a construction which enables the belt to be readily removed for maintenance or repair. To remove the belt, any auxiliary components attached through brackets 83 can be initially removed from the conveyor frame 3, and the spindle assembly can then be moved inwardly to slacken the belt. The belt can then be slipped laterally from the conveyor frame.

In addition, the construction of the invention provides a simple and effective mechanism for precisely adjusting the tension and tracking of the belt. It is contemplated that the tracking mechanism can be used without the tensioning mechanism to adjust the tracking of a belt that is trained on a spindle or roller that is movable longitudinally relative to the conveyor frame.

The conveyor can be readily attached to a supporting structure or base through use of the clamps 25 and various auxiliary components can be readily attached anywhere along the length of the conveyor through use of the spring nuts 75.

FIGS. 10-13 illustrate a modified form of the invention utilizing a pair of spaced parallel conveyors 84. Each conveyor includes an outer side rail 85, similar in construction to side rails 4 of the first embodiment, and having a generally T-shaped longitudinal slot 86. In addition, each side rail 85 is formed with an upper groove 87 and a lower outwardly extending rib or flange 88, similar in construction and function to groove 19 and rib 20 in side rails 4 as previously described.

Generally rectangular stiffening members 89, similar to stiffeners 40, are mounted on the inner surface of each side rail 85 and a plurality of cross members 90, similar to cross members 5, are connected between the stiffeners 89, in the manner previously described.

Each conveyor also includes a flat bed plate 91 which is supported on the upper surfaces of the cross members 90, as well as on the respective stiffener 89 and side rail 85. A conveyor belt 92 rides on the upper surface of bed plate 91, as shown in FIG. 12

Figure 12:
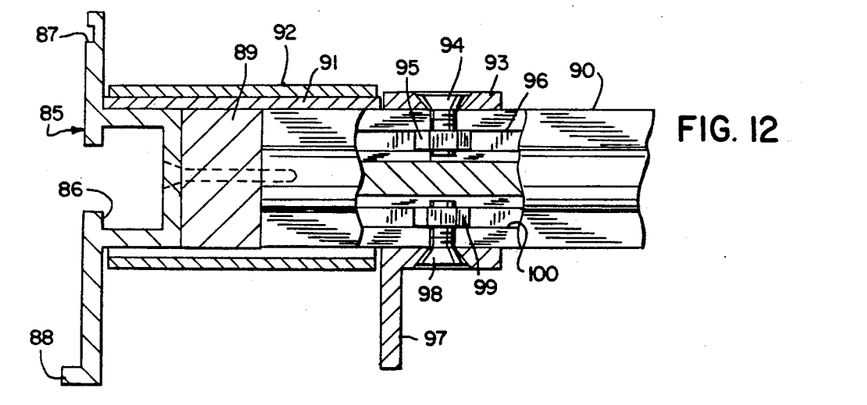
FIG. 12 is a section taken along line 12—12 of FIG. 10.

An upper side guide 93 is connected to the upper surfaces of cross members 90, as seen in FIG. 12, and extends along the inner side edge of the belt 92 of each conveyor 84. The side guides can be connected to the cross members, as previously described, by screws 94 which extend through openings in the side guides and are engaged with nuts 95 which are mounted for sliding movement within longitudinal slots 96 in the upper surface of the cross members 90.

In addition to the upper guide 93, an angle-shaped lower guide 97 can be mounted to the lower surfaces of the cross members 90 and is located adjacent the side edge of the lower run of the corresponding belt 92. As in the case of the upper guides 93, the lower guides 97 are connected to the cross members by screws 98 which extend through openings in the upper flange or the lower guides and are received within nuts 99 which are slidable within the lower grooves or slots 100 in the cross members 90, as seen in FIG. 12.

The belts 92 of the two conveyors 84 are driven by a common drive spindle 101 which extends between the outer side rails 85 of the conveyors. Drive spindle 101 can be operably connected to a suitable drive mechanism, such as a hydraulic or electric motor, in a conventional manner and rotation of the drive spindle 101 will serve to drive the belts 92 of the two conveyors 84 in unison.

Figure 13:
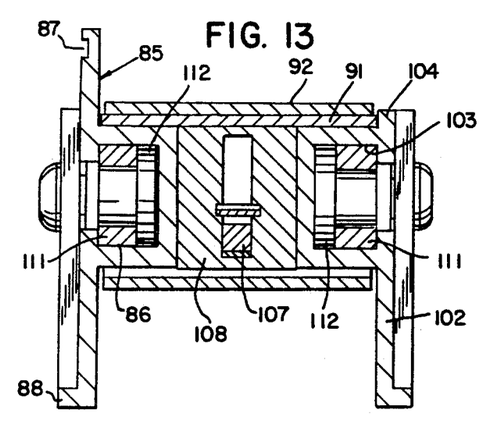
FIG. 13 is a section taken along line 13—13 of FIG. 11.

The end of each conveyor 84, opposite the end which carries the drive spindle 101, projects beyond the last cross member 90 of the series and an inner side rail section 102 is connected to the projecting end of each outer side rail 85. Each side rail section 102 is formed with a longitudinal T-shaped slot 103, as shown in FIG. 13. However, the upwardly extending flange 104 of the side rail section 102 terminates beneath the level of the belt 92, as shown in FIG. 13, so that an article to be conveyed can span the distance between the conveyors 84 without interference from the side rail sections 102.

Figure 11:
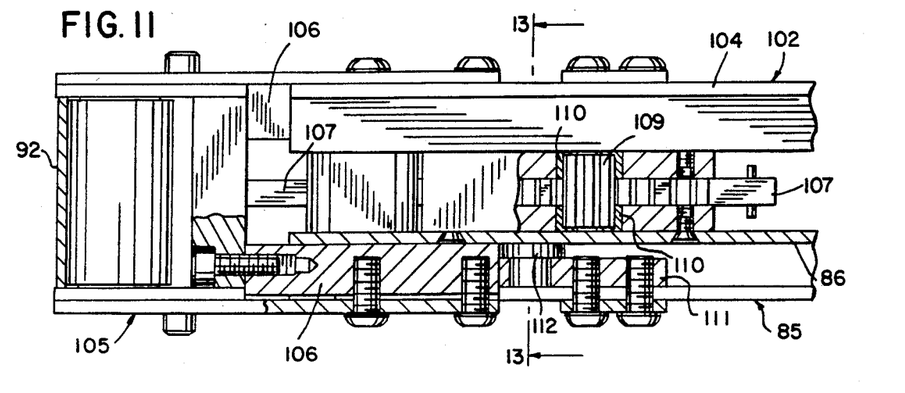
FIG. 11 is an enlarged top plan view with parts broken away and showing the belt tensioning and tracking mechanisms of a conveyor of FIG. 10.

The projecting end of each conveyor 84 includes a spindle assembly 105, similar to spindle assembly 10, previously described. Each spindle assembly 105 includes a pair of parallel slide bars 106 which are slidable in the slot 86 in the side rail 85 and in the slot 103 of the side rail section 102. The spindle assembly 105 of each conveyor can be moved longitudinally of the conveyor by a rack and pinion tensioning mechanism similar to that previously described. As illustrated, each conveyor 84 is relatively narrow in width and therefore only a single rack 107 is utilized with each conveyor. As shown in FIGS. 11 and 13, a guide block 108 is secured centrally between the side rail 86 and the respective inner side rail section 102, and rack 107, similar to rack 57 of the first embodiment, is mounted for sliding movement in the guide block 108. The outer end of the rack is adapted to engage the cross member of spindle assembly 105, as previously described. A pinion 109, similar to pinion 64, extends transversely across each conveyor 84 and is journaled for rotation in a pair of wear rings 110 bordering a transverse opening in guide block 108. Through rotation of pinion 109, the rack 107 can be moved longitudinally to thereby move the spindle assembly 105 and adjust the tension on the belt 92, as previously described.

The embodiment as shown in FIGS. 10–13 also includes a tracking mechanism similar to that described in the first embodiment. Cam blocks 111 are mounted for sliding movement in the slot 86 of side rail 85, as well as in the slot 103 of side rail section 102 of each conveyor, and a cam 112, similar to cam 67, is mounted for rotation relative to each cam block. Through rotation of each cam 112, as previously described, each side bar 106 of the spindle assembly 105 can be individually moved relative to the conveyor frame to provide proper tracking for each conveyor belt 92.

Figures 15, 16:
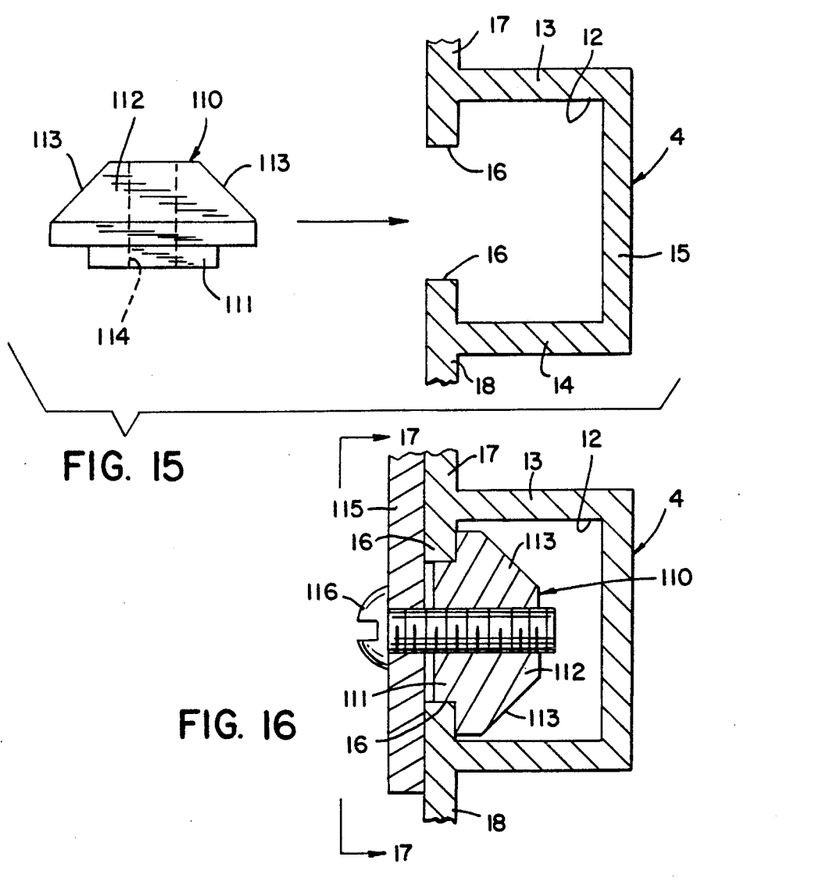
FIG. 15 is an exploded view of a T-nut and side rail of the conveyor.
FIG. 16 is a fragmentary transverse section showing a T-nut assembled with the side rails.
Figure 17:
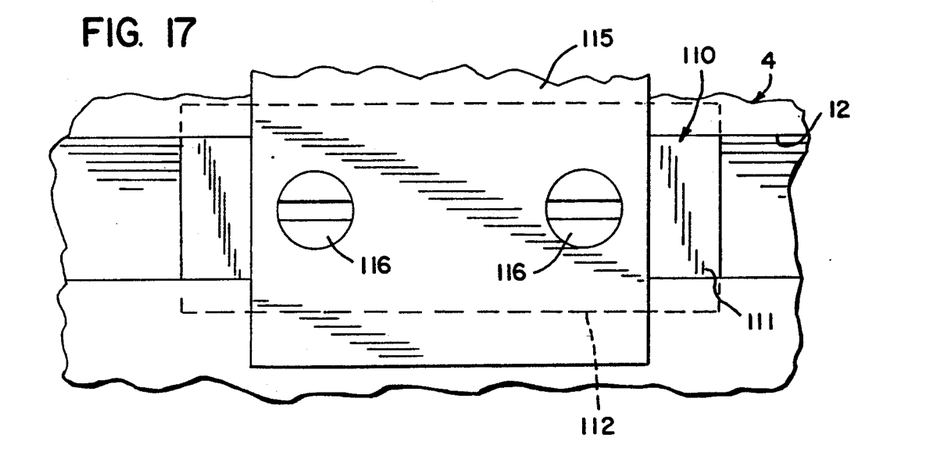
FIG. 17 is a view taken along line 17—17 of FIG. 16.

FIGS. 14–16 illustrate a construction for attaching heavier weight or larger components to the conveyor frame utilizing an elongated bar 110 having a generally T-shaped cross section. Bar 110 comprises a generally rectangular outer section 11 and an inner section 112 having tapered inner edges 113. A pair of spaced threaded holes 114 extend through bar 110.

As seen in FIG. 15, the front-to-rear dimension of bar 110 is less than the distance between lips 16 of side rail 14 so that the bar can be inserted into slot 12. After insertion into slot 12, bar 110 is rotated 90° to the position shown in FIG. 16. The tapered or beveled edges 113 permit the bar to be rotated in the slot 12 and after rotation, the section 111 is then moved outwardly between lips 16 to the lock the bar against rotation. The vertical dimension section 111 is slightly less than the vertical distance between legs 16.

An auxiliary component 115 can be attached to bar 110 by bolts 116 which are threaded in holes 114.

With this construction, bars 110 can be slid within slots 12 anywhere along the length of the side rails 4 to properly position the components 116. As the bar 110 has a substantial length, it will effectively resist any rotation force applied to the bar by large size or heavy components, such as motors, that may be attached to the conveyor frame.

Various modes of carrying out the invention are contemplated as being within the scope of the following claims particularly pointing out and distinctly claiming the subject matter which is regarded as the invention.

We claim:

1. A conveyor construction, comprising a frame including a pair of spaced side rails, an endless conveyor member mounted for movement on said frame, a spindle assembly including a rotatable spindle extending transversely of said frame and disposed to support said conveying member, guide means for guiding the spindle assembly for longitudinal movement on said frame, tensioning means operably connected to said spindle assembly for moving said spindle assembly relative to said frame to thereby adjust the tension on said conveying member, said spindle assembly including a link extending transversely between the sides of the spindle assembly, pivot means for pivoting each end of said link to the respective side of the spindle assembly about a pivot axis normal to the path of travel of said conveying member, the pivotal attachment of said link to the sides of said spindle assembly enabling each side of the spindle assembly to move individually relative to said side rails, and tracking means operably connected to said spindle assembly and separate from said tensioning means for individually moving each side of the spindle assembly relative to the corresponding side rail to thereby adjust the tracking of said conveying member on said frame.

2. The construction of claim 1, wherein said guide means comprises a longitudinal first guide member on each side rail and said spindle assembly includes a pair of second guide members each slidable with respect to a first guide member.

3. The construction of claim 2, wherein said first guide members comprise slots in said side rails and said second guide members comprise spaced parallel bars slidable in said slots, said spindle being journaled for rotation relative to said bars.

4. The construction of claim 1, wherein said belt tensioning means comprises a pinion member and a rack member engaged with said pinion member, a first of said pinion and rack members being mounted for movement longitudinally of said frame and engageable with said spindle assembly, and, actuating means operably connected to a second of said pinion and rack members, operation of said actuating means acting through said second member to move said first member longitudinally and apply tension to said belt.

5. The construction of claim 4, wherein said rack member is mounted for movement longitudinally of said frame and said pinion member extends transversely of said frame, said actuating means being operably connected to said pinion member.

6. The construction of claim 4, and including releasable locking means for preventing movement of said first member relative to said frame.

7. The construction of claim 5, wherein said rack member and said pinion member are disposed between said side rails, said actuating means comprises a socket in an end of said pinion member and exposed through an opening in a side rail.

8. The construction of claim 5, and including journaling means connected to said side rails for journaling said pinion member for rotation.

9. The construction of claim 2, wherein said spindle assembly also includes a cross member extending between said second guide members and disposed parallel to said spindle.

10. The construction of claim 5, wherein each side of the spindle assembly includes an inwardly projecting abutment, the ends of said link being pivoted to said abutments, an end of said rack member being engaged with an abutment.

11. A conveyor construction, comprising a frame including a pair of spaced side rails, a belt mounted for movement on said frame, a spindle assembly including a rotatable spindle disposed transversely of said frame and disposed to support said conveyor belt, guide means for guiding said spindle assembly for longitudinal movement on said frame, said spindle assembly including a link extending transversely between the sides of the spindle assembly, pivot means for pivoting each end of said link to the respective side of the spindle assembly about a pivot axis normal to the path of travel of said belt, the pivotal attachment of said link to the sides of said spindle assembly enabling each side of the spindle assembly to move individually relative to said side rails, and belt tracking means for individually moving at least one side of said spindle assembly relative to the corresponding side rail to thereby adjust the tracking of said belt on said frame.

12. The construction of claim 11, wherein said guide means includes a pair of spaced longitudinal guide members mounted for longitudinal movement on said frame, said spindle being journaled on said guide members, said belt tracking means comprising eccentric means mounted for movement relative to a side rail and engageable with the respective guide member, and means for moving said eccentric means to thereby selectively move said guide member relative to said frame.

13. A conveyor construction, comprising a frame including a pair of spaced side rails, a conveyor belt mounted for movement on said frame, a spindle assembly including a rotatable spindle extending transversely of said frame and disposed to support said belt, guide means for guiding the spindle assembly for longitudinal movement on said frame, belt tensioning means operably connected to said spindle assembly for moving said spindle assembly relative to said frame to thereby adjust the tension on said belt, and belt tracking means operably connected to said spindle assembly and separate from said belt tensioning means for individually moving each side of the spindle assembly relative to the corresponding side rail to thereby adjust the tracking of said belt on said frame, said belt tracking means comprising cam means mounted for movement relative to said frame and operably engaged with the side of said spindle assembly.

14. The construction of claim 13, wherein said guide means comprises a pair of spaced guide members on said spindle assembly each mounted for sliding movement relative to one of said side rails, said spindle being journaled with respect to said guide members, said cam means being operably connected to each side rail for individually moving each guide member longitudinally of said frame to adjust the tracking of said belt.

15. The construction of claim 14, wherein each cam means comprises a cam block mounted for longitudinal movement relative to the respective side rail, a cam member mounted for rotation on each cam block and engageable with the respective guide member, and locking means for locking the cam block to the respective side rail.

16. The construction of claim 15, wherein said guide means also includes a longitudinal slot in each side rails to receive the respective guide member, each cam block being slidable in a corresponding slot.

17. A conveyor construction, comprising a frame having a pair of spaced side rails, each side rail having a longitudinal slot, a conveyor belt mounted for movement on said frame, a spindle assembly including a pair of side members each slidable in a slot of a side rail, said spindle assembly also including a rotatable spindle journaled in said side members and disposed to support said conveyor belt, an abutment projecting laterally inward from each side member, belt tensioning means comprising rack means disposed between said side rails and mounted for movement in the direction of movement of said belt, pinion means mounted for rotation relative to said frame and engaged with said rack means to move said rack means in said direction, an end of said rack means operably engaged with said abutments, movement of said rack means in one direction moving said spindle assembly longitudinally outward of said frame to adjust the tension on said belt, and locking means for locking each side member to the respective side rail to retain the spindle assembly in a given position relative to said frame.

18. The construction of claim 17, wherein said pinion means is disposed between said side rails and said pinion means includes a socket to receive a tool, a side rail having an opening to expose said socket.

19. A conveyor construction, comprising a frame including a pair of spaced parallel side rails, a spindle assembly connected to an end of said frame, said spindle assembly including a pair of parallel side members each mounted for longitudinal movement relative to a corresponding side rail, a spindle extending between said side members, a conveyor belt supported on said spindle, each end of the spindle having an axial opening, a hub secured to each side member and projecting into the opening in the corresponding end of the spindle, and journaling means disposed entirely within each opening for journaling the spindle for rotation on the corresponding hub, each side member including an inner wall and an outer wall that is disposed flatwise to said inner wall, each inner wall having an aperture to freely receive the respective hub, each outer wall having a non-circular opening, the outer end of each hub being noncircular in cross section and received within said noncircular opening in said outer wall to thereby prevent rotation of each hub relative to the respective side member.

20. The construction of claim 19, wherein said non-circular opening is defined by at least one straight edge and the outer end of each hub has a flat to mate with said straight edge.

21. The construction of claim 19, wherein each side rail is provided with a longitudinal slot and said side members are mounted for sliding movement in the respective slots.

* * * * *

UNITED STATES PATENT AND TRADEMARK OFFICE
CERTIFICATE OF CORRECTION

PATENT NO. : 5,174,435
DATED : December 29, 1992
INVENTOR(S) : Wolfang C. Dorner, et. al.

It is certified that error appears in the above-indentified patent and that said Letters Patent is hereby corrected as shown below:

Col. 10, line 63, claim 4, cancel "belt"; Col. 10, line 68, claim 4, after "and", cancel "," (comma);
Col. 12, line 23, claim 16, cancel "rails" and substitute therefor -- rail--.

Signed and Sealed this

Twentieth Day of September, 1994

Attest:

BRUCE LEHMAN

Attesting Officer      Commissioner of Patents and Trademarks